Oct. 30, 1928.
S. H. WINN
1,689,575
BOILER FITTING
Filed Dec. 20, 1926
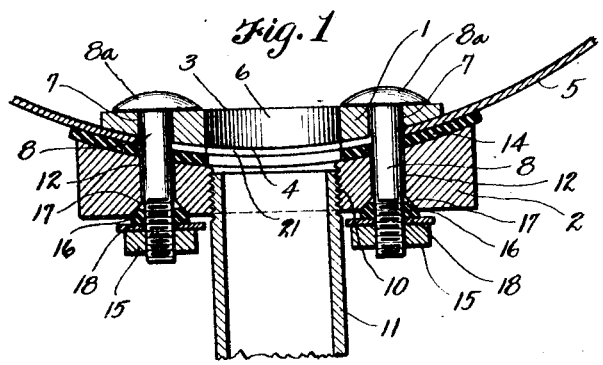
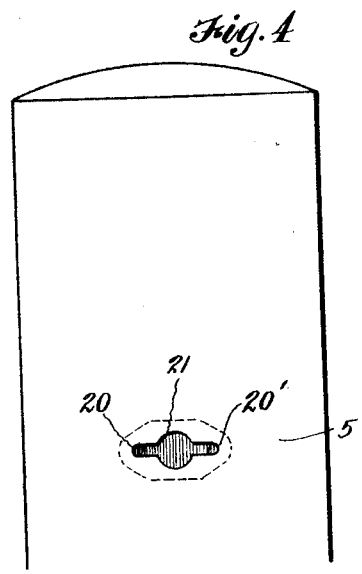
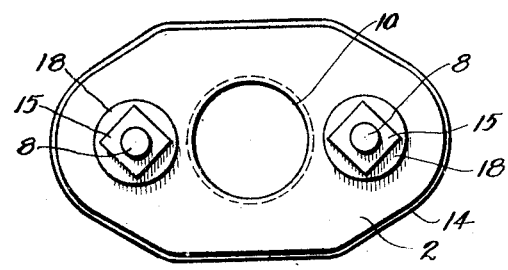
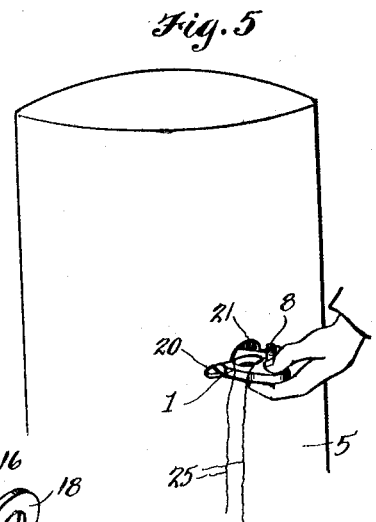
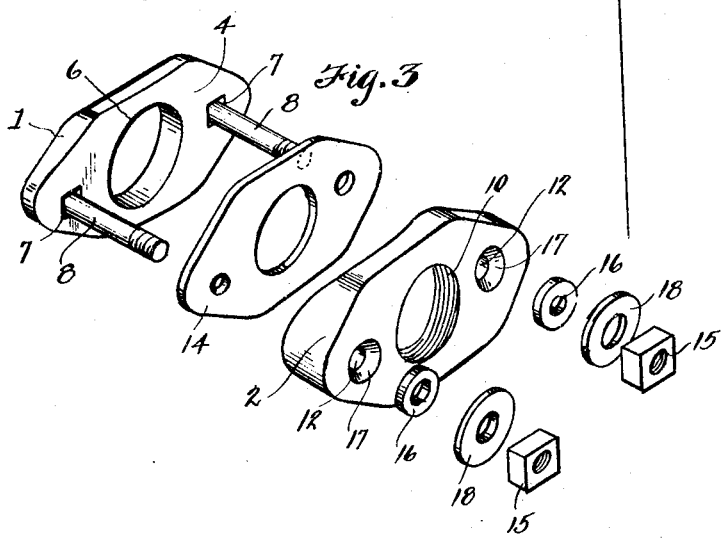
INVENTOR
S. H. WINN
BY
Richard H Cook
ATTORNEY Patented Oct. 30, 1928.

1,689,575

UNITED STATES PATENT OFFICE.

SPERRY H. WINN, OF SEATTLE, WASHINGTON.

BOILER FITTING.

Application filed December 20, 1926. Serial No. 155,977.

This invention relates to boiler fittings and particularly to an improved means for connecting pipes with hot water boilers of that type ordinarily used in residences; the principal object of the invention being to provide means for greatly facilitating the work of attaching a pipe to a tank or boiler and which is relatively inexpensive and will provide tight and secure connection with the curved side wall of a boiler through which leakage is impossible.

More specifically stated, the object of the invention resides in the provision of a boiler fitting of the above character comprising inner and outer clamping plates that are applicable to the boiler wall about an opening, with a packing gasket interposed between the wall and outer plate and clamping bolts extended through the plates to draw them tight to preclude leakage; the outer plate having a threaded opening for attachment of the pipe.

Other objects reside in the various details of construction of the parts and in the method of assembling and applying them to the boiler.

In accomplishing these and other objects of the invention, I have provided the improved details of construction, the preferred forms of which are illustrated in the accompanying drawings, wherein—

Figure 1 is a horizontal, sectional view showing a fitting embodied by this invention as functionally applied to a boiler.

Figure 2 is an outside face view of the fitting.

Figure 3 is a perspective view showing the parts of the fitting in disassembled relation.

Figure 4 is a view of a tank showing the wall opening as prepared for receiving the fitting.

Figure 5 illustrates the method of inserting the inner clamping plate through the opening.

Referring more in detail to the drawings—

1 and 2, respectively, designate the inner and outer clamping plates; the inner plate having a flat inner surface 3 and a radially curved outer surface 4 adapted to fit against the inside surface of the boiler or tank wall, 5, as shown in Figure 1. Centrally of this plate, is an opening 6 and at its opposite ends are openings 7—7 through which the clamping bolts 8—8, used for attaching the fitting, are projected; said bolts having heads 8ª at their inner ends that seat against the flat inner surface 3 of the plate.

The outer clamping plate 2, in outline, has practically the same shape as plate 1 but is a little larger. It is provided centrally with a threaded opening 10 for receiving the end of the pipe which is to be connected thereby to the boiler; the pipe being designated at 11 in Figure 1. This plate 2 is provided with openings 12—12 at its opposite ends adapted to receive the outer end portions of the anchor bolts 8. A packing gasket 14, of rubber or other suitable material, is interposed between the outer face of the boiler wall and inner face of plate 2 for precluding leakage through the joint after the parts have been assembled and drawn tight by nuts 15 threaded onto the outer ends of the bolts. To preclude leakage about the bolts, I have applied gaskets 16 about the bolts, within reamed out seats 17 at the outer ends of the bolt holes 12—12 and these are clamped tightly beneath the washers 18 when the nuts 15 are tightened on the bolts.

In applying the fitting to a boiler or tank wall, the gasket 14 which has openings therein registering with the openings in the clamping plates may be used as a template for marking the location of the holes for the bolts and for the water outlet. Then the holes are drilled, or bored, through the boiler wall and slots are cut from the bolt holes, designated at 20—20' in Figure 4, into the outlet 21. This provides a transverse slot of sufficient length for receiving the plate 1 which is then inserted, as shown in Figure 5, through the slot and drawn into place as shown in Figure 1. Strings, as at 25 in Figure 5, may be attached to the bolts to hold them in place and for drawing them and plate 1 into position. With the inside plate and the bolts in place, the gasket 14 is then applied over the bolts and against the outer face of the boiler wall. Then the outer plate 2 is applied over the bolts, the gaskets 16 seated and the washers 18 and nuts 15 tightened on the bolts to draw all the parts tightly together. The pipe 11 is then connected with the threaded opening.

Such a fitting may be easily and quickly applied; it will preclude leakage and provides a substantial and lasting pipe connection. One of the advantages of its use is that it can be located at any place in a boiler wall.

If it is desired, the outer face 4 of plate 1 may be curved on a radius slightly less than the curvature of the surface of the tank wall against which it seats so as to compensate for any spring in the plate resulting from tightening the parts together. This will positively preclude leakage about the opening by making the joint tighter at this joint than at any other.

Such devices may be made in various sizes, shapes and for tanks of various diameters, and also they may be made to fit flat walls.

Having thus described my invention, what I claim as new therein and desire to secure by Letters-Patent, is:

In combination, a tank, having a wall provided with an opening and slots extending in the same line at opposite sides of said opening, and a fitting comprising an inner plate that is insertable edgewise into the tank through said opening and slots, and which may then be turned to overlie said opening and slots and is provided with a central outlet and with bolt holes adapted to register, respectively, with the said tank wall opening and ends of said slots, an outer plate fitted to the outside of the tank wall having a central opening that is threaded to receive a pipe and with bolt holes alined with the bolt holes of the inner plate; said holes being reamed out at their outer ends, bolts projected outwardly through the holes of the inner plate, the wall and outer plate, a packing gasket interposed between the tank wall and outer plate, nuts threaded onto the bolts for drawing the parts together and gaskets inserted about the bolts within the reamed parts of the holes for precluding leakage about the bolts.

Signed at Seattle, Washington, this 9th day of December, 1926.

SPERRY H. WINN.